United States Patent [19]
Jackson

[11] Patent Number: 5,049,798
[45] Date of Patent: Sep. 17, 1991

[54] CONTROL APPARATUS

[75] Inventor: Dale H. Jackson, Portsmouth, N.H.

[73] Assignee: Harris Graphics Corporation, Dover, N.H.

[21] Appl. No.: 492,935

[22] Filed: Mar. 13, 1990

[51] Int. Cl.$^5$ ............................................... H02P 5/00
[52] U.S. Cl. .................................... 318/640; 318/611; 318/616; 318/85
[58] Field of Search ............................. 318/560–640, 318/43–89

[56] References Cited

U.S. PATENT DOCUMENTS

| 2,954,514 | 4/1960 | Henstreet | 318/611 |
|---|---|---|---|
| 3,012,180 | 12/1961 | Finvold | 318/611 X |
| 3,408,549 | 10/1968 | Shimabukuro | 318/85 |
| 3,430,148 | 2/1969 | Miki | 318/85 X |
| 3,440,507 | 4/1969 | Derrick et al. | 318/84 X |
| 3,452,261 | 6/1969 | Tagliasacchi | 318/77 |
| 3,465,223 | 9/1969 | Mears | 318/72 |
| 3,557,686 | 1/1971 | Sapolsky | 318/85 X |
| 3,621,348 | 11/1971 | Uchida | 318/77 |
| 3,678,351 | 7/1972 | Shemanske | 318/61 |
| 3,728,596 | 4/1973 | Hermansson et al. | 318/71 X |
| 3,833,843 | 9/1974 | Bossons | 318/85 X |
| 3,991,349 | 11/1976 | Watson et al. | 318/84 |
| 3,991,350 | 11/1976 | Miyagoshi | 318/85 |
| 4,093,904 | 6/1978 | Burig et al. | 318/85 X |
| 4,147,966 | 4/1979 | Kain et al. | 318/601 X |
| 4,174,237 | 11/1979 | Hemming, Jr. et al. | 318/59 X |
| 4,443,742 | 4/1984 | Schneider | 318/85 |
| 4,460,852 | 7/1984 | Kondo et al. | 318/69 X |
| 4,492,901 | 1/1985 | Higashi | 318/85 |
| 4,654,569 | 3/1987 | Mizumoto et al. | 318/85 X |
| 4,691,152 | 9/1987 | Ell et al. | 318/616 |

OTHER PUBLICATIONS

*Electronics: Circuits and Devices* by Ralph J. Smith 1973, pp. 390–391.

Primary Examiner—Paul Ip
Attorney, Agent, or Firm—Tarelli, Sundheim & Covell

[57] ABSTRACT

The position of a drive shaft of a printing press is regulated during acceleration of the printing press. A position regulator includes a first integrator and a second integrator connected in tandem with the first integrator. The first integrator provides an output signal corresponding to the integral of the difference between a first position signal indicative of the desired position of the drive shaft and a second position signal indicative of the actual position of the drive shaft. The second integrator responds to the output signal from the first integrator to provide a control signal. A control asrrangement responds to the control signal from the second integrator to accelerate the drive shaft. During acceleration of the drive shaft, the difference between the first and second position signals is driven to a value of zero.

6 Claims, 3 Drawing Sheets

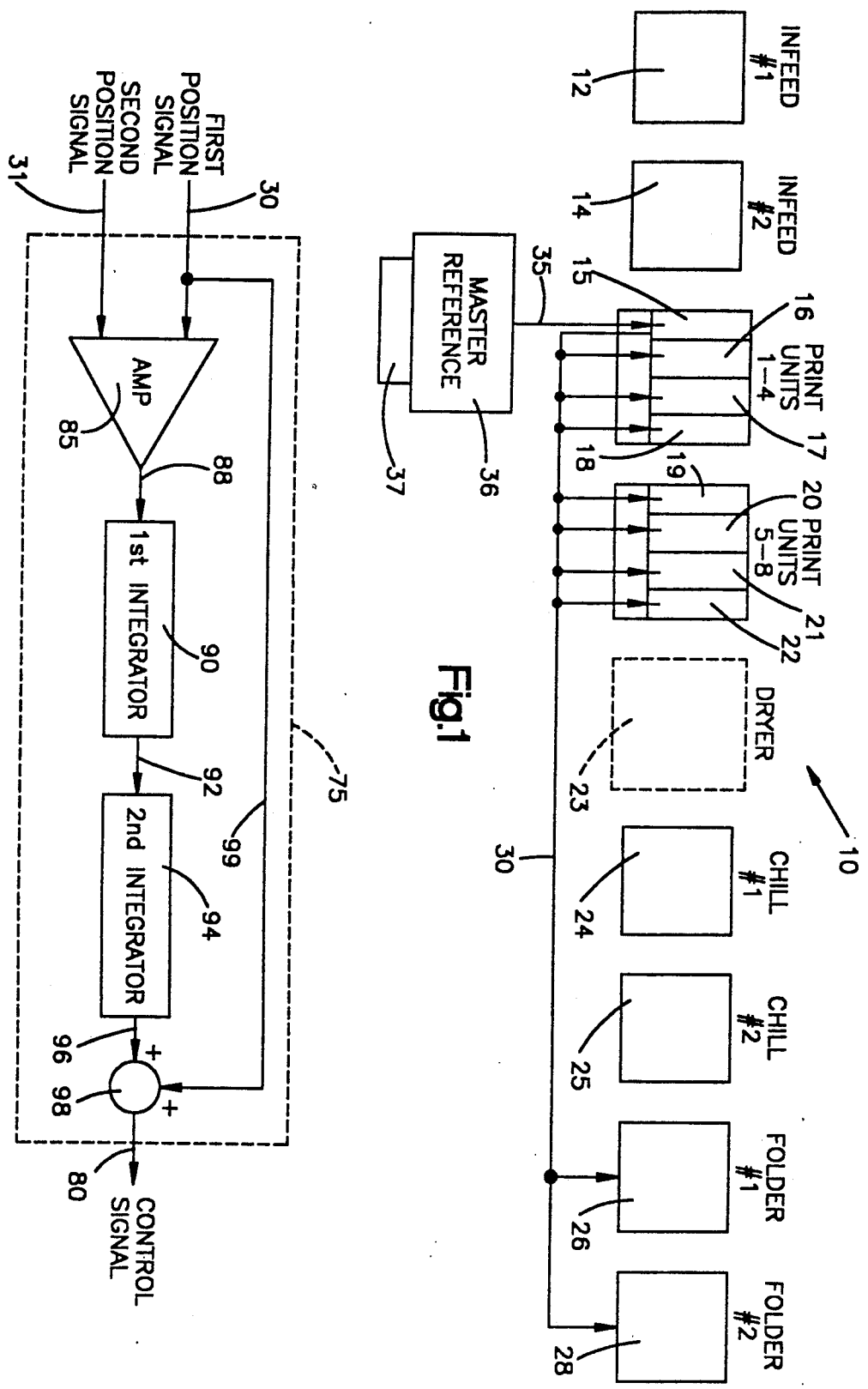

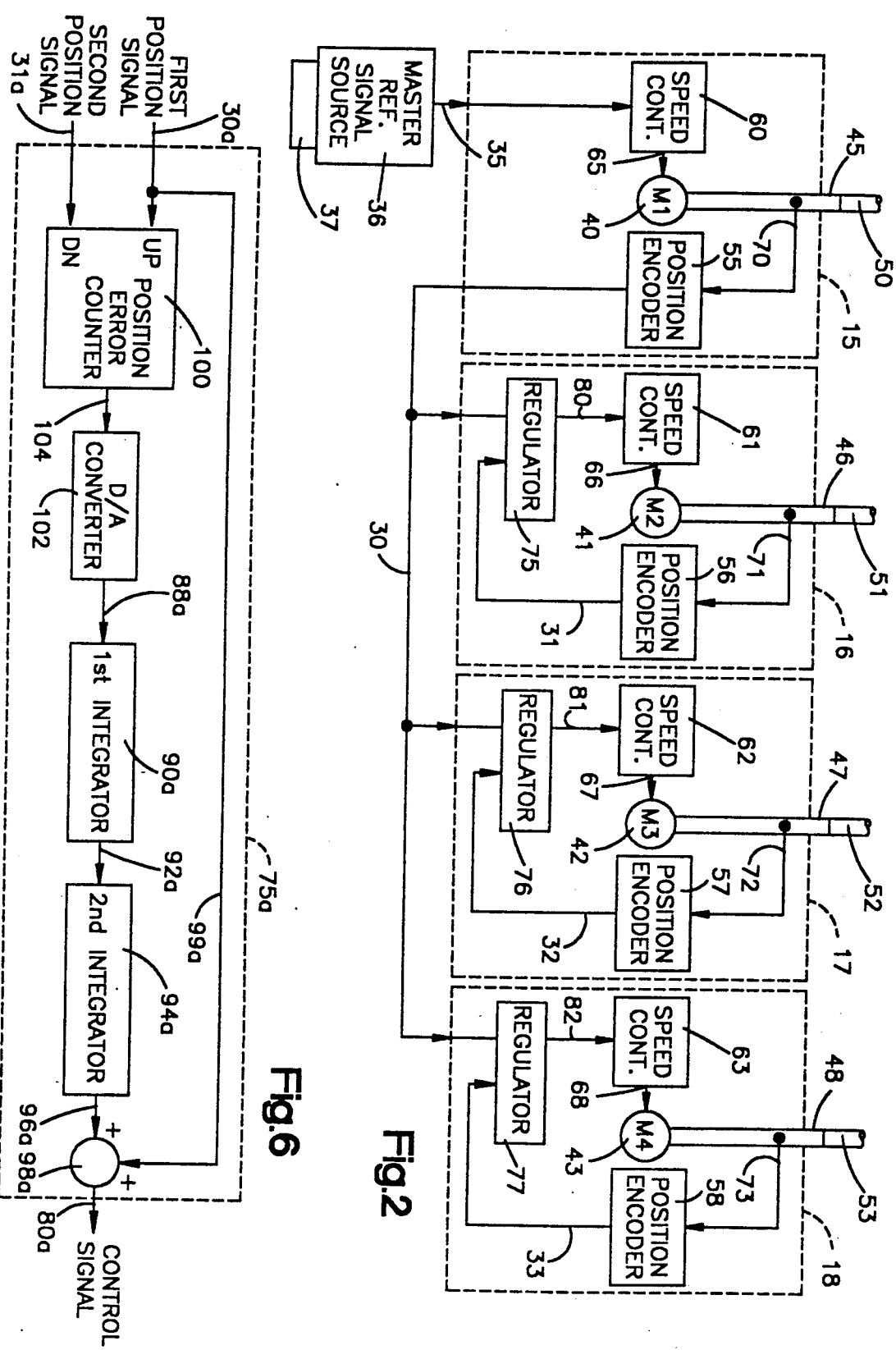

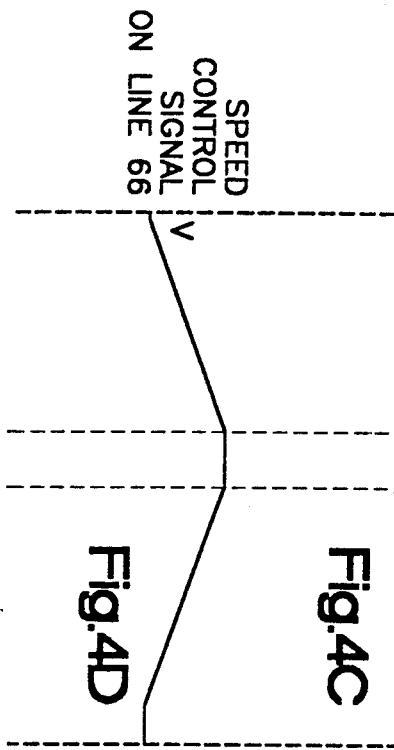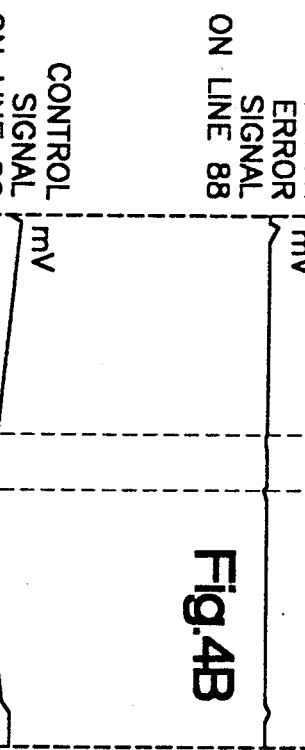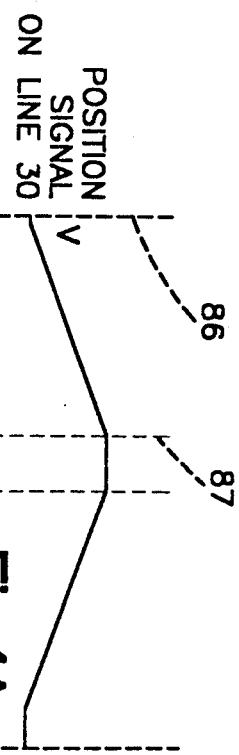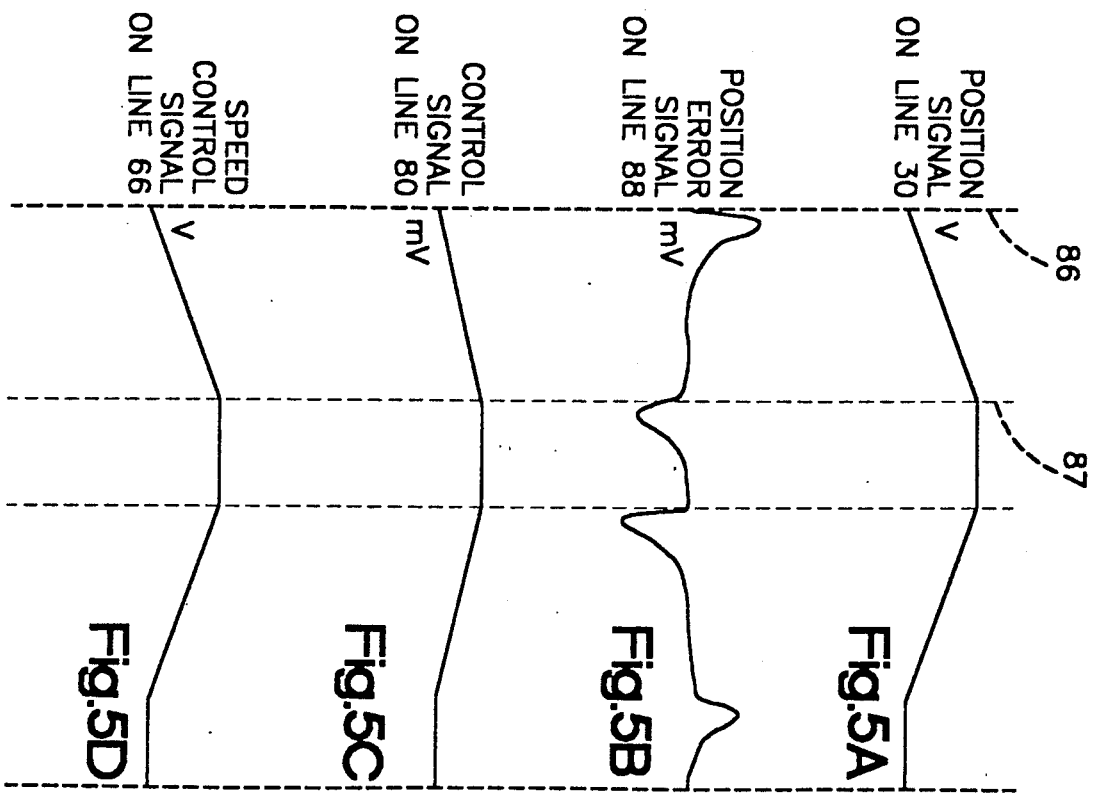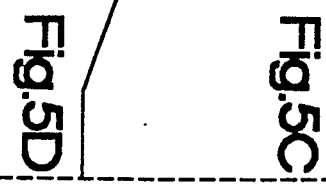

CONTROL APPARATUS

BACKGROUND OF THE INVENTION

1. Technical Field

The present invention relates to position regulation and is directed to an apparatus for regulating the position of a drive shaft for driving one unit of a printing press relative to the position of another drive shaft for driving another unit of the printing press during acceleration of the drive shafts.

2. Background Art

A printing press typically includes a number of printing units. In certain printing presses, each printing unit has a drive shaft which is drivingly connected with an output shaft of an electric motor for driving the drive shaft of that particular printing unit. A speed controller provides a speed control signal to control the rotational speed of the output shaft of the electric motor. The speed controller provides the speed control signal in response to a control output signal from a regulator. The control output signal from the regulator is generated in response to a signal indicative of the actual position of the drive shaft and another signal indicative of the actual position of another drive shaft of another printing unit, known as the master drive shaft.

The position of the drive shaft of each printing unit relative to the master drive shaft must be accurately controlled and maintained so as to maintain proper registration of the different printing units. Since the drive shaft of each printing unit is drivingly connected with the output shaft of its associated electric motor, the position of each output shaft relative to the master drive shaft must be accurately controlled and maintained so as to maintain proper registration of the different printing units. Proper registration of the different printing units is required to prevent errors such as printing registration errors, web tension errors, web-to-web registration errors, and/or signature cutoff errors.

Many types of regulators are available for regulating the position of a drive shaft relative to the position of a master drive shaft. One type of regulator for regulating the position of a drive shaft relative to the position of a master drive shaft is a phase-locked loop regulator in which the output signal of a closed-loop servomechanism locks onto the tracks a reference signal. Phase lock is accomplished by comparing the phases of the output signal and the reference signal. Any phase difference between the output signal and the reference signal is converted into an error correction signal. The error correction signal is used to modify the output signal of the closed-loop servomechanism so that the output signal tracks the reference signal.

Another type of regulator for regulating the position of a drive shaft relative to the position of a master drive shaft is a synchro regulator. In this type of regulator, a device known as a synchro is used to transform the angular position of the drive shaft into an electrical output signal indicative thereof. The position of the drive shaft relative to the position of the master drive shaft is regulated in response to the electrical output signal from the synchro regulator.

If a regulator such as the phase-locked loop regulator or the synchro regulator is used, an undesirable position error between the actual position of the drive shaft and the actual position of the master drive shaft results during acceleration of the printing press. This relative shaft position error during acceleration of the printing press is a steady-state error. This position error during acceleration of the printing press is undesirable because it may result in undesirable errors such as printing registration errors, web tension errors, web-to-web registration errors, and/or signature cutoff errors.

The value of the shaft position error during acceleration of the printing press could be reduced or even theoretically eliminated by using a regulator with open-loop compensation. Open-loop compensation is often referred to by other names such as "forcing", "speed reference", and "dp/dt feed-forward". Although a regulator with open-loop compensation may initially reduce the value of the shaft position error, such a regulator is subject to undesirable long-term component variation or hardware modification for maintenance.

SUMMARY OF THE INVENTION

In accordance with the present invention, an apparatus includes means for providing a first position signal indicative of the desired position of a drive shaft and means for providing a second position signal indicative of the actual position of the drive shaft. A position error signal is provided which is the difference between the first and second position signals. A first integrator receives the position error signal and provides a first output signal corresponding to the integral of the position error signal. A second integrator receives the first output signal from the first integrator and provides a second output signal corresponding to the integral of the first output signal. Control means including an electric motor is responsive to the second output signal from the second integrator and accelerates the drive shaft.

An apparatus constructed in accordance with the present invention is particularly suitable for regulating the position of a drive shaft of a printing unit during acceleration of the printing unit. Preferably, the second position signal is provided by a position encoder associated with the drive shaft, and the first position signal is provided by a position encoder associated with another drive shaft known as the master drive shaft. A position error amplifier takes the difference between the first and second position signals to provide the position error signal. The control means includes an electric motor having its output shaft drivingly connected with the drive shaft and a speed controller operatively connected with the electric motor. The speed controller responds to the second output signal from the second integrator to control the electric motor and to thereby regulate the position of the drive shaft.

BRIEF DESCRIPTION OF THE DRAWINGS

The foregoing and other features and advantages of the present invention will become apparent to one skilled in the art to which the present invention relates from reading the following description of preferred embodiments of the present invention in conjunction with the accompanying drawings, wherein:

FIG. 1 is a schematic block diagram of a printing press incorporating an apparatus constructed in accordance with the present invention;

FIG. 2 is a schematic block diagram of a portion of the printing press of FIG. 1;

FIG. 3 is an enlarged view of a shaft position regulator for the printing press of FIG. 2;

FIG. 4 is a graphical representation of operating voltage levels at certain locations in the shaft position regulator of FIG. 3;

FIG. 5 is a graphical representation of operating voltage levels at certain locations in another embodiment of the shaft position regulator similar to FIG. 3; and FIG. 6 is a view similar to FIG. 3 illustrating still another embodiment of the present invention.

DESCRIPTION OF PREFERRED EMBODIMENTS

The present invention is directed to an apparatus for regulating the position of a drive shaft for driving a unit relative to the position of another drive shaft for driving another unit during acceleration of the two drive shafts. The application and construction of the apparatus of the present invention may vary. The apparatus of the present invention is particularly suitable for use in a printing press and will be described herein as applied thereto.

Referring to FIG. 1, a printing press 10 has a number of units typically including infeeds, printing units, dryers, chill roll units, and folders. In FIG. 1, two infeeds 12, 14, eight printing units 15, 16, 17, 18, 19, 20, 21, 22, one dryer 23, two chill roll units 24, 25, and two folders 26, 28 are shown. As illustrated, the seven printing units 16–22 and the two folders 26, 28 are connected to and are responsive to a position signal on line 30 from the printing unit 15. The printing unit 15 is connected to and is responsive to a master reference signal on line 35 from a master reference signal source 36.

The master reference signal source 36 has a number of manual operable knobs 37 for adjusting the master reference signal on line 35. It is understood that the master reference signal source 36 may be automatically operable or may be automatically and manually operable for adjusting the master reference signal on line 35.

Referring to FIG. 2, a more detailed structure of the four printing units 15-18 is schematically illustrated. The four printing units 15-18 each include respective electric motors 40, 41, 42, 43 having respective output shafts 45, 46, 47, 48 which are drivingly connected with respective drive shafts 50, 51, 52, 53 of the printing press 10. The printing units 15-18 also each include respective position encoders 55, 56, 57, 58 which are operatively connected with the associated drive shafts 50, 51, 52, 53. The position encoders 55, 56, 57, 58 monitor on lines 70, 71, 72, 73, respectively, the actual positions of the drive shafts 50, 51, 52, 53 and provide position signals on lines 30, 31, 32, 33, respectively, indicative of the actual position of the associated drive shafts 50, 51, 52, 53. The four printing units 15-18 each further include respective speed controllers 60, 61, 62, 63 for providing speed control signals on lines 65, 66, 67, 68 to the associated electric motors 40, 41, 42, 43. The speed controller 60 of the printing unit 15 provides its speed control signal on line 65 in response to the master reference signal on line 35 from the master reference signal source 36.

The three printing units 16-18 each include respective shaft position regulators 75, 76, 77. The regulators 75, 76, 77 monitor the position signal on line 30 from the position encoder 55 and monitor the position signals on lines 31, 32, 33, respectively, from the associated position encoders 56, 57, 58. The regulators 75, 76, 77 provide control signals on line 80, 81, 82, respectively, to the associated speed controllers 61, 62, 63 in response to the position signal on line 30 and to the position signals on lines 31, 32, 33. The structure and operation of each of the regulators 75, 76, 77 is the same. For simplicity, only the structure and operation of the regulator 75 for the printing unit 16 will be described in detail.

Referring to FIG. 3, the regulator 75 is schematically illustrated in detail. The regulator 75 includes a position error amplifier 85 having one input connected to the position signal on line 30 and the other input connected to the position signal on line 31. The position signal on line 30 is indicative of the actual position for the drive shaft 50 and the position signal on line 31 is indicative of the actual position of the drive shaft 51. The desired position of the drive shaft 51 is the actual position for the drive shaft 50. The position error amplifier 85 processes the position signal on line 30 and the position signal on line 31 and provides an analog output signal on line 88 indicative of the position error between the desired position of the drive shaft 51 and its actual position.

The position error signal on line 88 is connected to the input of a first integrator 90. The first integrator 90 integrates the position error signal on line 88 and provides an output signal on line 92 to the input of a second integrator 94. The signal on line 92 corresponds to the integral of the difference between the position signal on line 30 from the position encoder 55 in the printing unit 15 and the position signal on line 31 from the position encoder 56 in the printing unit 16. The second integrator 94 integrates the signal on line 92 from the first integrator 90 and provides an output signal on line 96 to a summing junction 98. The signal on line 96 corresponds to the integral of the signal on line 92 from the first integrator 90.

At the summing junction 98, the signal on line 96 from the second integrator 94 is summed with a signal on line 99 to provide the control signal on line 80. The signal on line 99 is the same as the position signal on line 30 from the position encoder 55 in the printing unit 15. The summing of the signal on line 96 from the second integrator 94 with the position signal on line 30 tends to reduce the position error of the drive shaft 51 during acceleration of the drive shaft 51. This specific technique for reducing the position error of the drive shaft 51 during acceleration of the drive shaft 51 is known in the art as open-loop compensation or feed-forwarding.

The knobs 37 of the master reference source 36 are adjusted to a predetermined setting to accelerate the two drive shafts 50, 51 from zero speed to a predetermined speed. When the knobs 37 are adjusted to the predetermined setting, the master reference signal on line 35 steadily increases. The speed controller 60 responds to the steadily increasing master reference signal on line 35 to provide a steadily increasing speed control signal on line 65 to thereby steadily increase the rotational speed of the output shaft 45 of the motor 40. As the rotational speed of the output shaft 45 steadily increases, the position encoder 55 provides a steadily increasing position signal on line 30.

The regulator 75 acts on the steadily increasing position signal on line 30 to provide a steadily increasing control signal on line 80. The speed controller 61 responds to the steadily increasing control signal on line 80 to provide a steadily increasing speed control signal on line 66 to thereby steadily increase the rotational speed of the output shaft 46 of the motor 41. As the rotational speed of the output shaft 46 steadily increases, the position encoder 56 provides a steadily increasing position signal on line 31. The regulator 75 also acts on the steadily increasing position signal on line 31 to provide the steadily increasing control signal on line 80. Thus, during acceleration of the drive shafts 50, 51 from zero speed to the predetermined speed, the regulator 75 acts simultaneously on the steadily increasing position signal on line 30 and the steadily increasing position signal on line 31 to provide the steadily increasing control signal on line 80.

The regulator 75 provides the steadily increasing control signal on line 80 while driving the difference between the steadily increasing position signal on line 30 and the steadily increasing position signal on line 31 i.e., the position error signal, to zero during acceleration of the drive shafts 50, 51. The second integrator 94 must provide an acceleration ramp signal on line 96 in order for the regulator 75 to provide the steadily increasing control signal on line 80 from the summing junction 98. The signal on line 92 from the integrator 90 must be at a constant value in order for the second integrator 94 to provide an acceleration ramp signal on line 96. This is because the integral of a constant value signal is a ramp signal. Similarly, the position error signal on line 88 from the position error amplifier 85 must be at a value of zero in order for the first integrator 90 to provide a constant value signal on line 92. This is because the integral of a value of zero is a constant value signal.

By connecting the first and second integrators 90, 94 in tandem and processing the position error signal on line 88 to provide the acceleration ramp signal on line 96 in the manner just described, the position error signal on line 88 is driven to zero during acceleration of the drive shafts 50, 51 from zero speed to the predetermined speed. Since the desired position of the drive shaft 51 is the same as the actual position of the drive shaft 50, the actual position of the drive shaft 51 is the same as the actual position of the drive shaft 50 when the position error signal is at zero. By maintaining the actual position of the drive shaft 51 the same as the actual position of the drive shaft 50 during acceleration of the drive shafts 50, 51 from zero speed to the predetermined speed, errors such as printing registration errors, web tension errors, web-to-web registration errors, and/or signature cutoff errors due to shaft position errors between the two printing units 15, 16 are minimized. Thus, the first and second integrators 90, 94 in the regulator 75 cooperate to drive the position error signal on line 88 to zero and maintain it at zero during acceleration of the drive shafts 50, 51 to thereby minimize errors such as printing registration errors, web tension errors, web-to-web registration errors, and/or signature cutoff errors.

The control signal on line 80 stops increasing and levels off at a predetermined level upon the drive shafts 50, 51 reaching the predetermined speed. The control signal on line 80 stops increasing and levels off at the predetermined level because the regulator 75 is operating closed loop to provide the control signal on line 80 in response to the position signal on line 30 and the position signal on line 31. The drive shafts 50, 51 operate in a steady-state condition by continuing to operate at the predetermined speed. As the drive shafts 50, 51 operate in the steady-state condition, the difference between the position signal on line 30 and the position signal on line 31, i.e., the position error signal on line 88, is maintained at a value of zero. The position error signal on line 88 is therefore driven to a value of zero and maintained at zero during acceleration of the drive shafts 50, 51 from zero speed to the predetermined speed and during operation of the drive shafts 50, 51 in the steady-state condition at the predetermined speed. The position error signal on line 88 is maintained at a value of zero during acceleration and during operation in the steady-state condition because the first and second integrators 90, 94 are connected in tandem and cooperate to process the position error signal on line 88 in the manner as described hereinabove.

Referring to FIGS. 4A–4D, the operation of the shaft position regulator 75 with feed-forwarding, i.e., with the signal on line 99, is better understood. FIGS. 4A–4D depict voltage waveforms at select locations in the shaft position regulator 75. Specifically, FIG. 4A shows the position signal on line 30 from the position encoder 55 in the printing unit 15, FIG. 4B shows the position error signal on line 88 in the regulator 75, FIG. 4C shows the control signal on line 80 from the regulator 75 and FIG. 4D shows the speed control signal on line 66 from the speed controller 61. The scale of FIGS. 4A and 4D is in "volts", and the scale of FIGS. 4B and 4C is in "millivolts".

When the position signal on line 30 linearly increases from the dashed line 86 to the dashed line 87 as shown in FIG. 4A, the speed control signal on line 66 as shown in FIG. 4D also linearly increases to accelerate the output shaft 46 of the motor 41. This, in turn, accelerates the drive shaft 51 of the printing press 10. While the drive shaft 51 is accelerating, the position error signal on line 88 as shown in FIG. 4B is at a value of zero except during transient periods. The control signal on line 80 from the shaft position regulator 75 has approximately the waveform as shown in FIG. 4C because of the presence of the feed-forwarding signal on line 99 which is the same as the position signal on line 30.

Referring to FIGS. 5A–5D, the operation of the shaft position regulator 75 without feed-forwarding, i.e., without the signal on line 99, is better understood. FIGS. 5A–5D depict voltage waveforms at select locations in the shaft position regulator 75. Specifically, FIG. 5A shows the position signal on line 30 from the position encoder 55 in the printing unit 15, FIG. 5B shows the position error signal on line 88 in the regulator 75, FIG. 5C shows the control signal on line 80 from the regulator 75, and FIG. 5D shows the speed control signal on line 66 from the speed controller 61. The scale of FIGS. 5A and 5D is in "volts", and the scale of FIGS. 5B and 5C is in "millivolts".

When the position signal on line 30 linearly increases from the dashed line 86 to the dashed line 87 as shown in FIG. 5A, the speed control signal on line 66 as shown in FIG. 5D linearly increases to accelerate the output shaft 46 of the motor 41. This, in turn, accelerates the drive shaft 51 of the printing press 10. While the drive shaft 51 is accelerating, the position error signal on line 88 as shown in FIG. 5B is at a value of zero except during transient periods. The position error signal on line 88 takes approximately the waveform as shown in FIG. 5B. The position error signal on line 88 is maintained at a value of zero during acceleration of the drive shaft 51 even though the feed-forwarding signal is not present on line 99.

Although the position error signal on line 88 is maintained at a value of zero when the feed-forwarding signal is not present on line 99, its waveform is not as smooth as the waveform when the feed-forwarding signal is present on line 99. The difference in smoothness between these two waveforms is seen by comparing FIG. 4B and FIG. 5B. When the feed-forwarding signal is not present on line 99, the waveform of the control signal on line 80 from the regulator 75 has approximately the waveform as shown in FIG. 5C.

The structure and operation of the regulator 76 in the printing unit 17 and the regulator 77 in the printing unit 18 are identical to the regulator 75 in the printing unit 16 as described hereinabove. Further, it will be understood that each of the four printing units 18, 19, 20, 21 and each of the folders 26, 28 includes a regulator identical to the regulator 75 in the printing unit 15. The structure and operation of the regulator in each of the four printing units 19, 20, 21, 22 and in each of the folders 26, 28 is identical to the structure and operation of the regulator 75 in the printing unit 16. The position error signal in each of the regulators is driven to a value of zero and maintained at zero during acceleration of the associated drive shaft. By maintaining the position error signal in each of the regulators at zero during acceleration of the associated drive shafts, errors such as printing registration errors, web tension errors, web-to-web registration errors, and/or signature cutoff errors are minimized.

Another embodiment of the present invention is shown in FIG. 6. Since the embodiment of the invention illustrated in FIG. 6 is generally similar to the embodiment of the invention illustrated in FIG. 3, similar numerals are utilized to designate similar components, the suffix letter "a" being associated with the embodiment of FIG. 6 to avoid confusion.

As shown in FIG. 6, the combination of a position error counter 100 and a digital-to-analog converter 102 is used in place of the position error amplifier 85 in the embodiment shown in FIG. 3. The first position signal on line 30a from the position encoder 55a is in the form of a pulse train signal. The second position signal on line 31a from the position encoder 56a is also in the form of a pulse train signal.

The position error counter 100 is of the up-count/-down-count type. As shown in FIG. 6, the position error counter 100 is connected so that it counts up in response to pulses from the pulse train position signal on line 30a from the position encoder 55a in the printing unit 15a and counts down in response to the pulses from the pulse train position signal on line 31a from the position encoder 56a in the printing unit 16a. By pulsing the position error counter 100 to count up and to count down, as the case may be, in response to the pulse train position signal on line 30a and to the pulse train position signal on line 31a, the position error counter 100 provides an output signal on line 104 indicative of the difference between the desired position of the drive shaft 51 and its actual position. The signal on line 104 is the position error signal. The position error signal on line 104 is in digital form and is converted to analog form on line 88a via the digital-to-analog converter 102. The operation of the shaft position regulator 75a in FIG. 6 is the same as the operation of the shaft position regulator 75 in the embodiment shown in FIG. 3.

This invention has been described above with reference to preferred embodiments. Modifications and changes may become apparent to one skilled in the art upon reading and understanding this specification. It is intended to include all such modifications and changes within the scope of the appended claims.

Having described preferred embodiments of the invention, I claim:

1. An apparatus comprising:
   means for providing a first position signal indicative of the desired position of a first shaft;
   means for providing a second position signal indicative of the actual position of the first shaft;
   means for providing a position error signal, the position error signal being the difference between the first and second position signals;
   a first integrator for receiving the position error signal and for providing a first output signal corresponding to the integral of the position error signal;
   a second integrator for receiving the first output signal from said first integrator and for providing a second output signal corresponding to the integral of the first output signal;
   means for providing a third output signal corresponding to the sum of the first position signal and the second output signal from said second integrator; and
   control means responsive to the third output signal for accelerating the first shaft.

2. An apparatus as set forth in claim 1 wherein said means for providing the first position signal includes a first position encoder operatively connected with a second shaft for providing the first position signal which is indicative of the actual position of the second shaft.

3. An apparatus as set forth in claim 2 wherein said means for providing the second position signal includes a second position encoder operatively connected with the first shaft for providing the second position signal.

4. An apparatus as set forth in claim 1 wherein said means for providing the position error signal includes a position error amplifier which takes the difference between the first and second position signals.

5. An apparatus as set forth in claim 1 wherein said means for providing the position error signal includes a bidirectional counter which counts in one direction in response to the first position signal and counts in the other direction in response to the second position signal.

6. An apparatus as set forth in claim 1 wherein said control means includes a motor having an output shaft and a speed controller which controls the rotational speed of the output shaft of said motor in response to the third output signal.

* * * * *